United States Patent [19]

Weibel

[11] 4,054,782

[45] Oct. 18, 1977

[54] DEVICE FOR COUNTING AND CALCULATING

[75] Inventor: Ewald Rudolph Weibel, Bern, Switzerland

[73] Assignee: Image Analysing Computers Limited, England

[21] Appl. No.: 732,043

[22] Filed: Oct. 13, 1976

Related U.S. Application Data

[63] Continuation-in-part of Ser. No. 530,535, Dec. 9, 1974, abandoned.

[30] Foreign Application Priority Data

Dec. 10, 1973 Switzerland ....................... 17248/73

[51] Int. Cl.[2] ....................... G02B 27/22; G06F 15/02

[52] U.S. Cl. ..................................... 364/555; 350/130; 364/525; 364/705; 364/512; 364/413

[58] Field of Search .................... 353/7, 10; 235/151.3, 235/92 CP, 92 DP, 92 GC, 92 QC, 92 PD, 93, 151, 530, 535; 350/130, 132; 356/168; 340/172.5

[56] References Cited

U.S. PATENT DOCUMENTS

| | | | |
|---|---|---|---|
| 3,380,031 | 4/1968 | Clayton et al. | 340/172.5 |
| 3,594,734 | 7/1971 | Wang et al. | 340/172.5 |
| 3,633,211 | 1/1972 | Batzdorff | 235/92 PD X |
| 3,675,213 | 7/1972 | Spangler | 340/172.5 |
| 3,760,171 | 9/1973 | Wang et al. | 340/172.5 X |
| 3,760,375 | 9/1973 | Irwin et al. | 340/172.5 |
| 3,855,461 | 12/1974 | Stockwell | 340/172.5 X |
| 3,894,802 | 7/1975 | Higgins | 353/7 X |

*Primary Examiner*—Edward J. Wise

*Attorney, Agent, or Firm*—Oblon, Fisher, Spivak, McClelland & Maier

[57] ABSTRACT

A device is described for obtaining counting and calculating stereological data. The device includes a number of separate counters each of which can be used to accumulate the numerical value of a point count or intersect count made using a test system typically in the form of a matrix of perpendicular lines superimposed over a display of the field to be analysed.

The apparatus provides for enlarged real images of the specimen which may be on film or a microscope slide, to be formed on a frosted glass screen on which a test pattern is visible.

First computing means is provided for computing from information relating to the test system the numerical values of constants required by a second computing means to convert the numerical values of point or interest counts into numerical values of different parameters of the specimen.

A selector is provided in conjunction with each counter to allow selection of the parameter to be computed from the numerical value of the count in that counter and digital displays are provided for giving a continuous read out of the mean and relative standard deviation of a series of calculated values of each parameter.

An additional digital read out device is provided for indicating the number of separate calculations performed.

The test pattern is formed from a file overlay or is projected onto the screen with the image from a cathode ray tube and pattern generator.

10 Claims, 10 Drawing Figures

DEVICE FOR COUNTING AND CALCULATING

CROSS-REFERENCE TO RELATED APPLICATIONS

This application is a continuation-in-part of Parent Application Ser. No. 530,535, filed Dec. 9, 1974, now abandoned the subject matter of which is incorporated in its entirely herein.

BACKGROUND OF THE INVENTION

1. Field of the Invention

The present invention relates to a device for obtaining, counting and calculating stereological data. In stereology, which deals predominantly with the representation and interpretation of three-dimensional structures on the basis of sectioned materials, various counting and calculating devices are in use. Generally speaking, two main fields of application can be distinguished: biology and material sciences (metallurgy and mineralogy) whereby a quantitative assessment of structures and structural changes of tissues and cells, or metallurgical data such as grain size grain distribution and phase changes are some of the principal endeavours. The invention will be described with particular reference to the analysis of biological structures, but is not limited to this field.

2. Description of the Prior Art

There are fully automatic devices in which the specimen to be investigated is introduced and which allow the results, such as volume densities, surface densities or number of elements to be read off directly. Such devices which usually employ television cameras, are very rapid and may save a lot of labour. However they are on the one hand very elaborate, and on the other hand it is often not possible to assess all structural components, especially if these are not unambiguously recognisable on the basis of differences in contrast; in such cases the trained eye may still show a superior performance.

There are also devices in which the operator introduces the data of interest into a calculating device, whereafter the compiled data are either read out on a display device or punched onto punch cards or punch tape. In order to obtain the scientifically interesting final data, such as for example volume density, its mean and relative standard deviation, these compiled data are introduced into a computer and are evaluated on the basis of a pre-determined programme. The disadvantage of this solution is that the results are usually not available immediately subsequent to collection of the data, because punch cards or punch tape must first be transferred to the computer which may not be immediately available.

SUMMARY OF THE INVENTION

It is an object of the invention to provide a self-contained counting and calculating device by which stereological data can be obtained by point counting, to introduce this data directly into a small computing unit, and to read off immediately thereafter the result.

It is a further object of the invention to provide means whereby an estimate can readily be made of the accuracy of the computed result immediately after each introduction of data.

According to the present invention a stereological counting and computing device comprises:

- an optical system for forming an image of a specimen;
- means for causing a test system to be seen in the plane of the image of the specimen;
- at least two manually operable counters for separately recording numerical data obtained from a visual analysis of the image of the specimen using the test system;
- a computing unit;
- means for determining which one of a plurality of test systems is in use and for supplying to the computing unit data relating to the test system whereby the computing unit is programmed to calculate numerical values of at least two parameters of the specimen from the data recorded in the counters together with the mean and relative standard deviation of the calculated values; and
- at least one display device for each of the mean and relative standard deviation whereby an estimate of the accuracy of the calculated values can be made after each entry of data from the counters.

Preferably the device includes means for indicating the parameter whose value is to be calculated by the computing unit from the numerical data entered in a counter.

Additionally there may be provided means for indicating the parameter to which a displayed mean value relates.

A device embodying the invention conveniently incorporates a counter which is indexed by 1 for each parameter value calculation performed by the computing unit, a display device for displaying the number stored in the counter and means for resetting the counter and display device to zero at the beginning of a series of tests on a specimen.

Preferably the display devices for the mean and relative standard deviation and the number of consecutive calculations are digital read out devices.

According to a preferred feature of the invention indicating means is provided, responsive to the parameter indicating means to indicate which of a plurality of test systems should be used for the analysis. Preferably the indicating means selects the appropriate test system and automatically locates it in position.

The invention will be further described by way of example with reference to the embodiment shown in the accompanying drawings.

Figure 1:
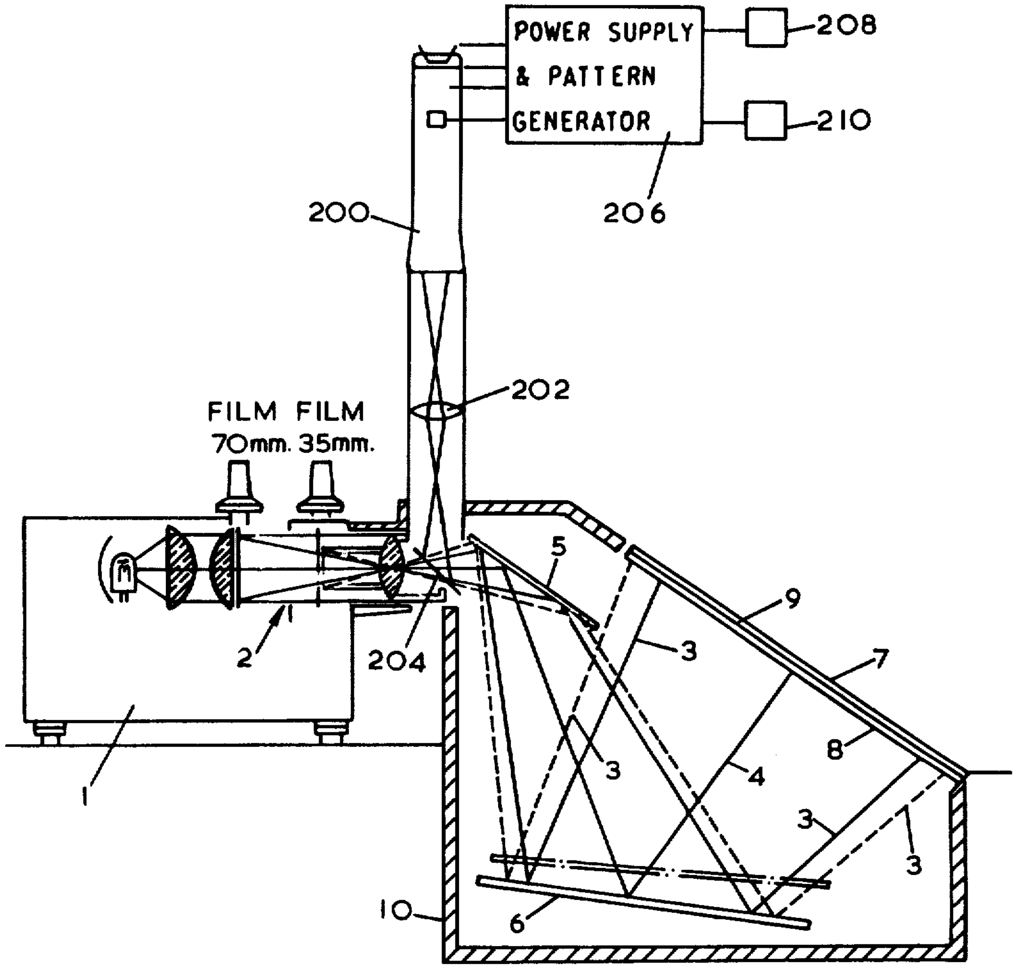
FIG. 1 shows a projection device.

DETAILED DESCRIPTION OF EMBODIMENT SHOWN IN THE DRAWINGS:

The projection device shown schematically in FIG. 1 consists essentially of a projector 1, for example a Leitz-Prado-Universal projector with its optic 2. This projector allows the specimen to be investigated to be introduced in form of a 35 or 70 mm film, but it is also possible to use diapositives or directly microscopic sections. The optic 2 enlarges the beams 3 and 3′ (for 70 mm and 35 mm film) which are deflected along the axis 4 by two mirrors 5 and 6, the latter being displaceable. They are finally projected on a screen of frosted glass (plate 8), the image being magnified about ten times. The screen is inclined in such a way that easy viewing is possible. Between the plate 8 and second plate 7 is a transparent film 9 carrying one of the test systems or patterns, examples of which are described below. The film is sealed in. The screens with the foil are exchangeable and are contained in a storage cabinet.

Figure 2:
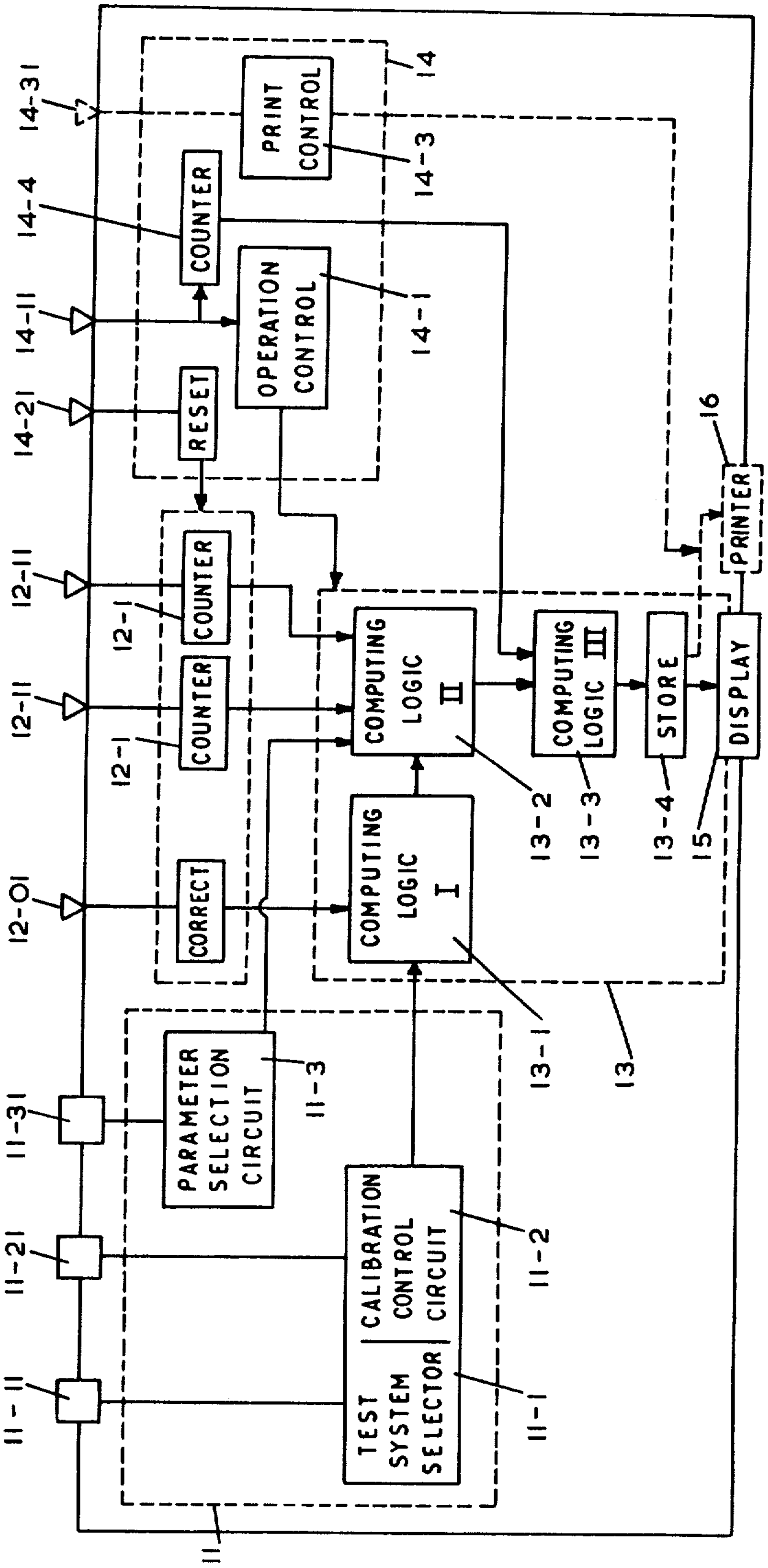
FIG. 2 is a simplified block diagram of part of the data acquisition and display device for use with the projection device of FIG. 1.

The actual counting and computing device can be subdivided into 4 blocks, as can be seen from the block diagram in FIG. 2.

1. The programme block 11 with the test system selector 11.1 and selection control 11.11, the calibration circuit 11.2 and calibration control 11.21 and the parameter selection circuit 11.3 and selection controls 11.31. 2. The primary counter block 12 with the field correction control 12.1 and the component counting controls 12.11 (of which there are 10 in the unit to be described). 3. The computing logic block 13 consists of the sub-blocks 13.1 for the calculation of the dimensions of the reference system, 13.2 for the calculation of stereological parameters, 13.3 for the statistics, and a data store 13.4. From this data store the final data are transferred either to the display device 15 or to a printer unit 16. It is evident, that these data can also be transferred to other media such as punch cards, punch tape or other interfaces for further evaluation. 4. The operation control block 14 contains the operation control circuit 14.1 with initiate control 14.11 which initiates and controls the computation process, the zero re-set control circuit 14.2 with reset button 14.21 which allows the counters to be reset to zero, the print control 14.3 with print out button 14.31 for initiating the print out of data if required, and the field counter unit 14.4 with display device 14.41 (see FIG. 3) which is triggered by operation control 14.1.

The functioning of the various blocks will now be described in detail wherever it appears necessary.

The test system selector 11.1 is essentially composed of a matrix of for example 4×6 numbers, whose function is to store the data which is required for the calculation of the reference dimensions of up to six different test systems 9. Each test system 9 of which four examples are shown in FIGS. 5 to 8, requires four numbers for its characterisation so, for example, for the test system of FIG. 6:

- $P_T$: the number of main test points = 64
- $q$ : square root of the ratio of the points in the dense lattice to the number of main test points = 3
- $k_l$ : a constant which relates $P_T$ and the calibration number $d$ with the total test line length $L_T = 1$
- $k_3$ : a constant which relates $P_T$ and $d$ with the unit test volume in view of a calculation of numerical density = 1,38

In contrast to the permanently programmed parameters of the test system selector 11.1 having control 11.11, the calibration number $d$ is entered by means of control 11.21, separately, in each case. The calibration number $d$ can be determined by means of a calibration scale which is connected with each test system whereby a calibration specimen can be introduced instead of the test specimen.

The two functional units 11.1 and 11.2 are, as seen from FIG. 2, connected to the sub-block 13.1 in view of the calculation of the dimensions of the reference system. The parameter selection circuit 11.3 however is connected with the sub-block 13.2 where the stereological parameters are calculated. By means of this parameter selection circuit 11.3 the following five parameters can be selected by means of dials:

- $V_V$ : volume density which is calculated from the point counts (P) of the main test points, whereby $V_V = P \cdot q^2 / P_T^*$ with $P_T^* = q^2 \cdot (P_T - P_O)$, where $P_O$ represents those points which do not belong to the field of measurement. ($P_O$ is entered by unit 12.0 by operation of control 12.01)
- $V_V'$: volume density which is calculated from the point count (P') of the fine point lattice by $$V_V' = P' / P_T$$

- $S_V$: surface density which is calculated from the intersection point counts (I) of the surface contour with the heavy lines (coarse lattice):

$$S_V = I / (\tfrac{1}{2} L_T^*)$$

whereby $(\tfrac{1}{2} L_T^*) = k_1 \cdot d \cdot (P_T - P_O)$ it is also possible to calculate in addition $S_V'$, that is the surface density calculated from the intersections with the fine line lattice.

- $N_V$ : numerical density of particles which is determined from the count of profiles ($N$) and the point counts ($P'$) of the fine line lattice which hit the profiles:

$$N_V = M N^3 3 P'$$

where M is a factor defined by the test system:

$$M = (q (K_3 d^3 (P_T = o)$$

in order to determine this parameter two counts must be performed $N$ and $P'$. It is to be noted that $N$ and $P'$ have to be counted with two counters which are internally connected.

- $c$: number of direct counts. This number can be used for the calculation of additional parameters.

The field correction unit 12.0 is directly connected with sub-block 13.1; its effect is to subtract those test points which do not belong to the test object from the total test point number. By means of the component counter unit 12.1 the individual components, or rather the events point hit, intersections etc. are counted and transferred according to a certain command to sub-block 13.2 for further calculation.

The computation logic block 13 is built, in the present case, of electronic elements; the logic sequence of steps is permanently programmed. It will also be possible however to connect the device to a programmable computer.

Sub-block 13.1 calculates, on the basis of data entered by 11.11, 11.21 and 12.0, the reference dimensions which are transferred to subblock 13.2. This sub-block calculates the stereological parameters on the basis of data received from sub-block 13.1 and parameter selection unit 11.3; these parameters are subsequently transferred to sub-block 13.3. This sub-block calculates on the basis of known programmes the means and relative standard deviation which are transferred to the store 13.4 in order to be outputted through display 15.

By means of the control unit 14.1 the computation logic is switched on following the termination of the counting procedure, whereafter the calculation of stereological parameters begins. Simultaneously the content of the counter which indicates the number of pictures analysed is incremented by 1; the new value is transferred to the statistic sub-block 13.3 where it is used for the calculation of mean and standard deviation. After completion of the calculation the counters 12.0,

12.1 and 12.2 are automatically cleared. However it is also possible to clear these counters by the clear control 14.21 without affecting the other stores; this may be necessary to eliminate an error. This means that after each screening of a test field, or of a picture projected onto the screen, the cumulated means and standard deviations are calculated and displayed, whereby the means are displayed in floating point form and the standard deviations in percent of the mean. Furthermore the number of test fields screened and the total number of point counts per field are displayed.

The input/output device (see FIGS. 3 and 4) is divided into two main parts: the lower blocklike part contains the counting and control keys, whereas the upper part, slanted upwards for easy reading, contains the programming and selection switches and their displays.

The upper row of the lower part contains the field correction key 12.01, the counter display 12.2 whcih displays the total number of points counted per test field, the control key 14.11 which triggers the computation sequence after completion of counting on one test field, as well as, optionally, the printing control key 14.31. Beneath, the ten counter keys 12.11 are arranged in two rows each controlling a counter 12.1. Two adjacent counters such as 1 and 6 or 2 and 7, are internally connected in such a way that data entered on using the two corresponding keys 12.11 can be used to calculate the numerical density of particles $N_V$.

In the left upper part the parameter selection dials 11.31 are shown to be arranged in two vertical rows. One parameter selection dial is associated with each of the ten counter keys 12.11 and numbered accordingly. By means of these parameter selection dials one of the five parameters described can be assessed with each of the counters 12.1 and displayed accordingly.

In order to reduce the size of the display part a display in rows was chosen whereby the display selector switch 15.1 allows to select which row of parameters is to be displayed. The display unit 15 comprises 5 × 2 display devices, whereby each parameter is associated with one display device for the mean and one for the relative standard deviation. By means of the test system selector dial 11.11 the data of the actually employed test system 9 can be entered whereby (see FIG. 4) the test system employed is displayed by means of a number or letter in a window 11.12. In window 14.41 the number of test fields analysed (*n*), that is the sample size, is displayed, whereby this counter is incremented automatically by the control key 14.11 through the unit 14.1. A small keyboard of for example 6 keys serves as a calibration control 11.21 and permits the introduction of the calibration number *d.* The clear control key 14.21 permits, in the case of a counting error, to zero the counters 12.0, 12.1 and 12.2. The main switch 22 serves the switching on and off of the device.

Figure 4:
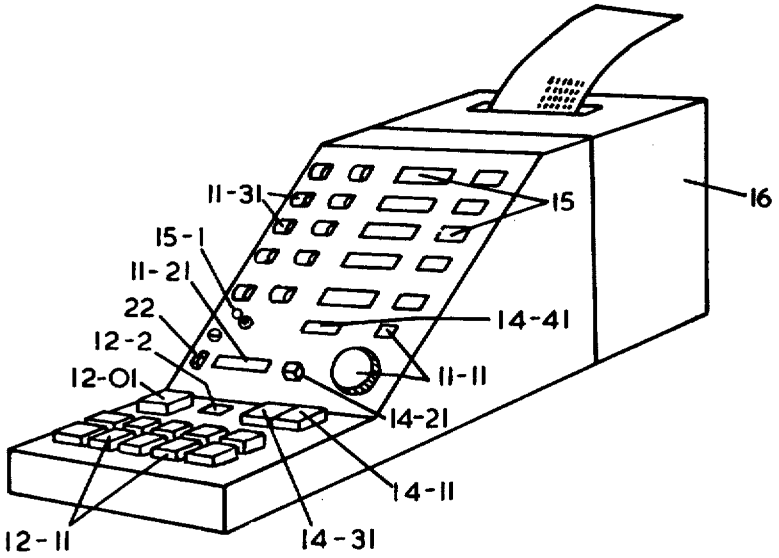

As shown in FIG. 4 a printing device 16 can be attached to the device, for example in the back.

FIGS. 5 to 8 show examples of four different test systems which are used for the screening of electron micrographs.

Figure 5:
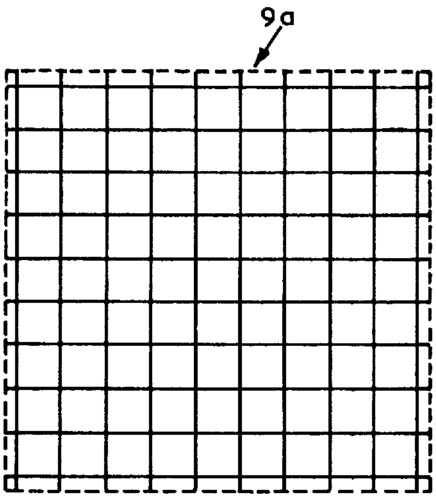
FIGS. 5 to 8 illustrate different types of test system.
Figure 6:
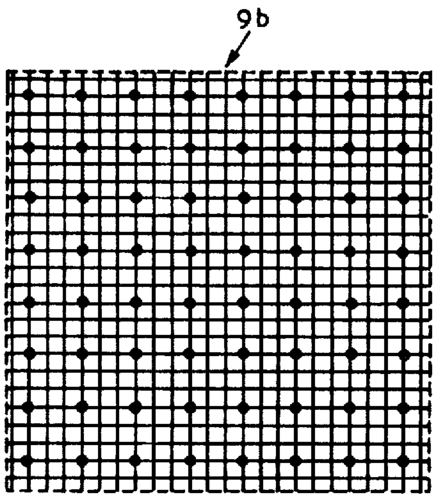
Figure 7:
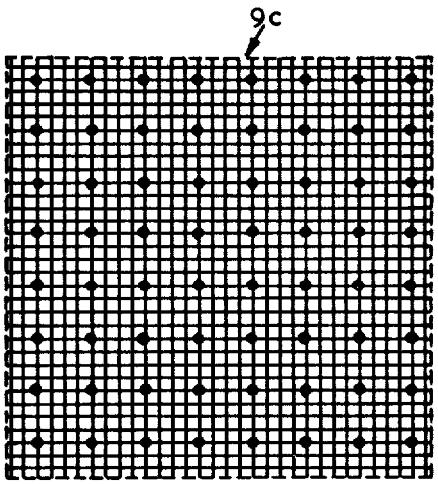
Figure 8:
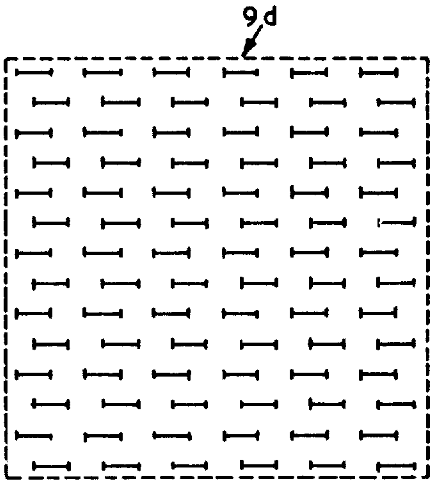

The test system 9*a* of FIG. 5 is a simple quadratic lattice, whereby the calibration scale is not shown. In test system 9*b,* FIG. 6, the quadratic coarse lattice of heavy lines is subdivided into a finer lattice by three further lines, whereby the test points of this dense lattice are used for example for the determination of volume density $V_V'$. The slightly enhanced intersection points of the heavy lines serve the easy and rapid orientation during screening whereby it should be noted that one quadrant of the circular dot around the point is left out for more precise localisation of the test point in the specimen. In test system 9*c,* FIG. 7, the coarse lattice is subdivided by four fine lines. The test system 9*d,* FIG. 8, is a so-called multipurpose test system, where short lines are disposed in a hexagonal pattern.

There exists a multitude of different test systems, so for example a test system with an isotropic quadratic lattice composed of semicircular lines. It is evident that different systems will be necessary for certain applications. The test systems used for screening light microscopic preparations are in principle of the same type, except that they usually contain less points.

In the following the functioning of this device is explained by means of an example from biology. At first it must be decided what stereological information is needed, and which test system is best used to obtain it. Assume that for example the volume density $V_V$, the surface density $S_V$, and the numerical density $N_V$ of lysosor are to be obtained, among other parameters; the final information will be the means and standard deviations of these parameters. This leads to the following scheme:

$V_V$ counter key 1 of the counter keys 12.11
$V_V'$ counter key 2 of the counter keys 12.11
$S_V$ counter key 3 of the counter keys 12.11
$N_V$ counter key 7 of the counter keys 12.11. (In this case counter 7 must be associated with counter 2 internally, as previously mentioned.)

Accordingly the first dial 11.31 is set to $V_V$, the second dial to $V_V'$, the third dial 3 to $S_V$, and the seventh dial to $N_V$. It will be appreciated that the other counters and parameter selection dials can be used simultaneously for other counts. Subsequently the test system chosen is indicated by means of the test system selection dial 11.11 and display 11.12, the calibration number *d* is determined and introduced by means of keyboard 11.21. The device is now ready to perform the counting, whereby each point or intersection count, that is P, P', I or N, are introduced by means of the corresponding counter key 12.11 according to the predetermined scheme. If parts of the picture are not to be included in the reference volume chosen (for example cytoplasm of liver cells), then the test points falling on such parts are entered by means of the field correction key 12.01. These counts are performed for a sufficient number of pictures, which ensures that reliable estimations of the parameter means are achieved.

If one of the parameters $V_V$, $S_V$ or $N_V$ are required, the device can be used to compile the direct counts. For this purpose the parameter selection dial is set to C, by which the means and standard deviation of these direct counts are displayed on the corresponding displays.

The above description of the device and of its way of functioning demonstrates that this device is on the one hand suitable to produce rapidly results where fully automated and accordingly more expensive devices cannot be employed, because this device makes use of a qualified human operator to decide on the identity of objects in the specimen; on the other hand the present device is very flexible. It permits a great number of different variations; for example the number of test systems and consequently the matrix of the test system selector unit 11.1, the number of counters and the number and type of parameters can be varied within wide limits. Obviously the programme for the evaluation of stereological parameters and of the statistical data can be adapted to the circumstances.

Figure 9:
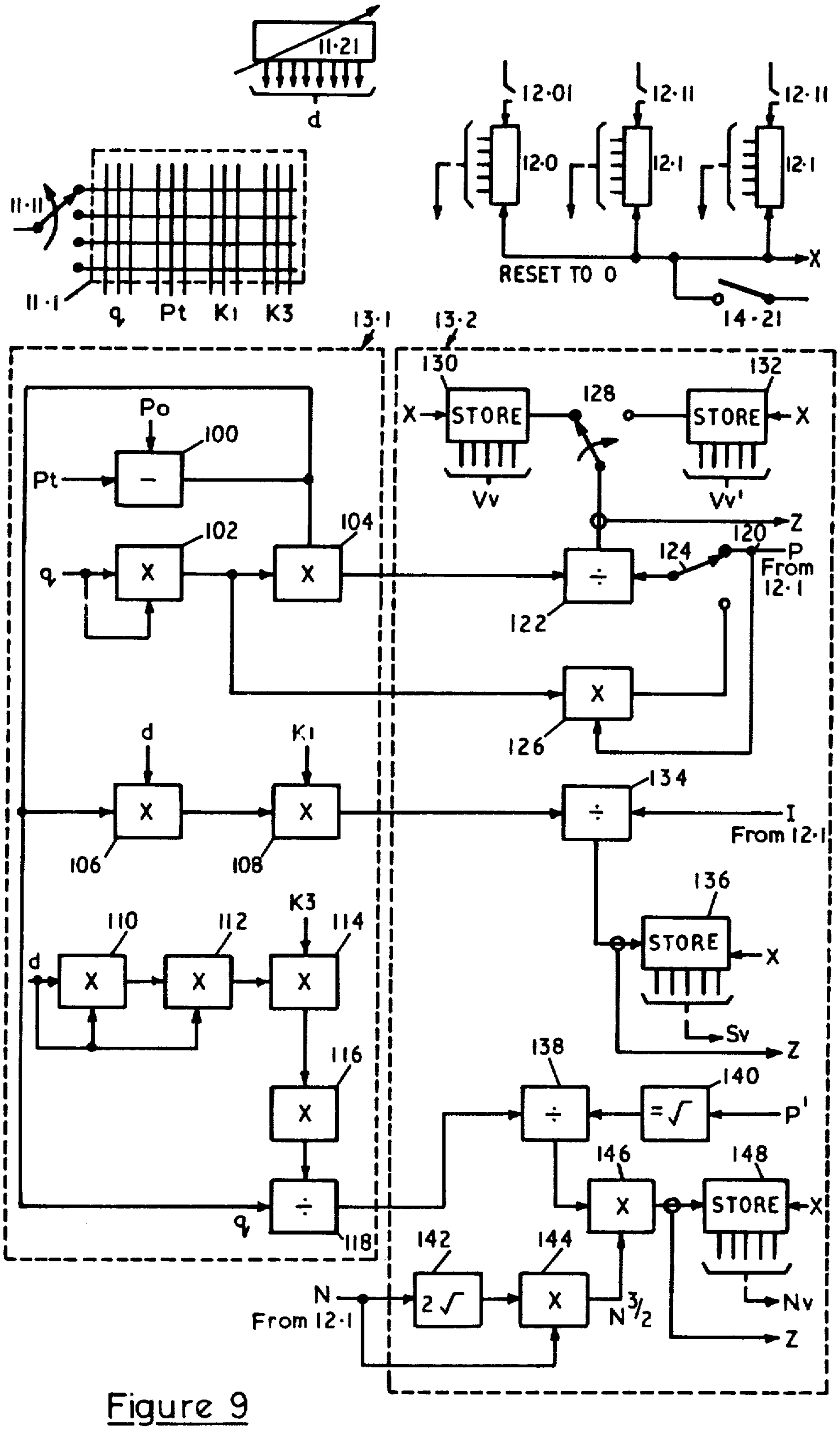
FIGS. 9 and 10 contain detailed block circuit diagrams of parts of the data acquisition and display device.
Figure 10:
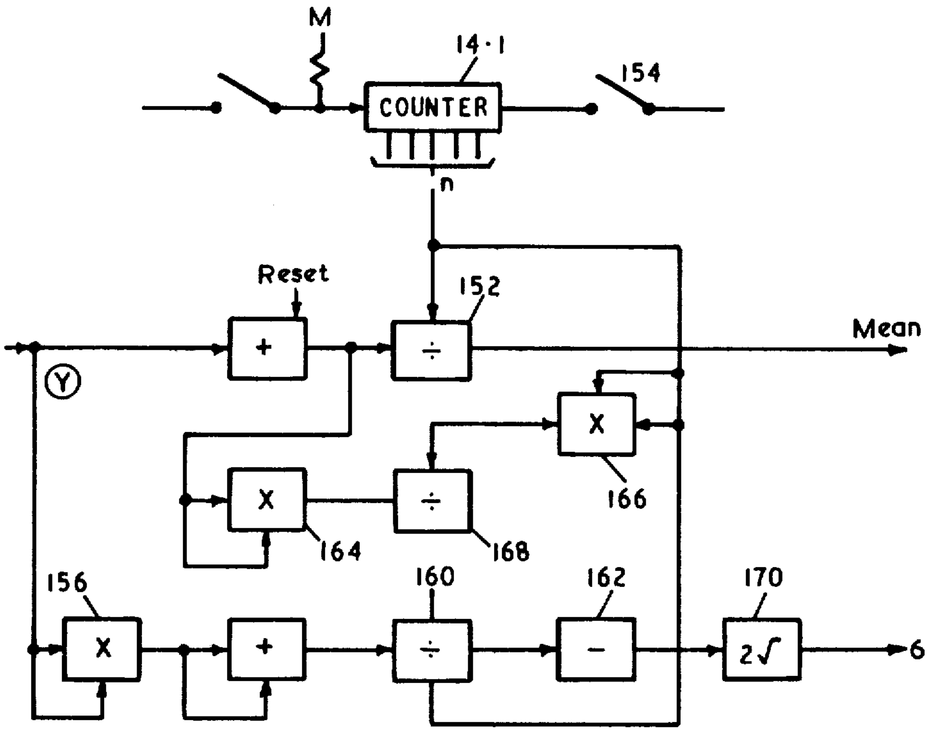
Figure 10:
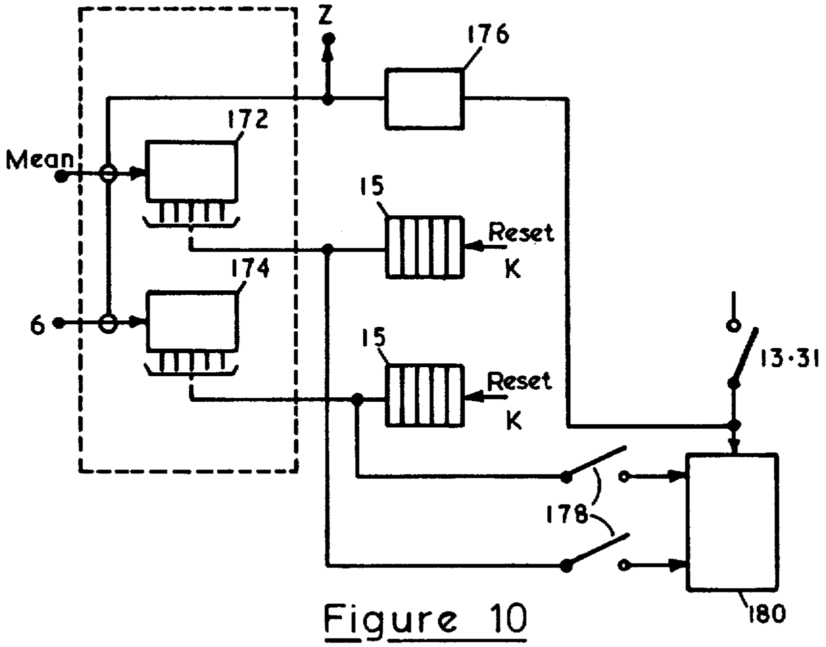

FIGS. 9 and 10 of the drawings contain a detailed block circuit diagrm of one embodiment of the counting and calculating portion of the device shown in FIGS. 1 to 4 of the drawings. Where appropriate the same reference numerals have been used to denote the circuit elements contained in the detailed block circuit diagram as have been used for the corresponding circuit elements in the block diagram of FIG. 2.

Turning first to FIG. 9, the test system selector 11.1 comprises a matrix switch for delivering different values of four parameters *q,* $P_T$, K1 and K3 on each of 4 output lines, the particular values of the different parameters being determined by the setting of a selector switch 11.11. The numerical values of the parameters are conveniently expressed in binary form so that each parameter value can be described by the signal levels on an appropriate number of lines.

The preset values of the parameters *q,* $P_T$, etc. are determined from the particular test systems to which the different switch positions of switch 11.11, relate. Accordingly by dialling the switch selector 11.11 to the appropriate position, so the correct parameter values will appear on the output lines for that particular test system.

It is to be understood that as a further refinement of the invention but not shown in the drawings, the selector switch 11.11 may be an automatic switch which is operated by, for example, an edge coding on the test system mask which is read by an appropriate edge reader. Thus the system parameters *q,* $P_T$, etc. may be automatically set by simply inserting any one of the test systems with which the device is arranged to work.

As a further refinement of the invention the test system may be introduced into the system optically by generating a particular pattern of light on a cathode ray tube 200 (see FIG. 1) which is focused via a lens 202 onto a semi-reflecting mirror 204 situated at a convenient position along the optical axis of the projection system shown in FIG. 1. The operation of the CRT 200 is controlled by a power supply and pattern generator circuit 206 having a selector control 208 by which one of a plurality of different patterns may be generated in the CRT display and introduced via lens 202 and mirror 204 into the projection system so as to appear on the frosted glass plate 8 forming the viewing screen. Where the test system is introduced in this way the film 9 (described as being inserted between the glass plates 7 and 8) may be dispensed with.

A further control 210 is provided to adjust the brightness of the CRT display so that the correct brightness can be selected having regard to the brightness of the displayed image.

The control 208 forms part of or is linked to the selector switch 11.11 whereby the appropriate system parameters are selected upon operation of the control 208.

As previously described, a calibration number *d* is also required and this is entered as described above by means of a control comprising a small keyboard 11.21 in FIG. 4 (having 6 keys). In the embodiment shown in FIGS. 9 and 10 this keyboard has been replaced with a so-called digital switch which will generate in binary form a number which can be selected by dialling the switch. The output from the switch is thus immediately available for transmission to computing circuits.

Figure 3:
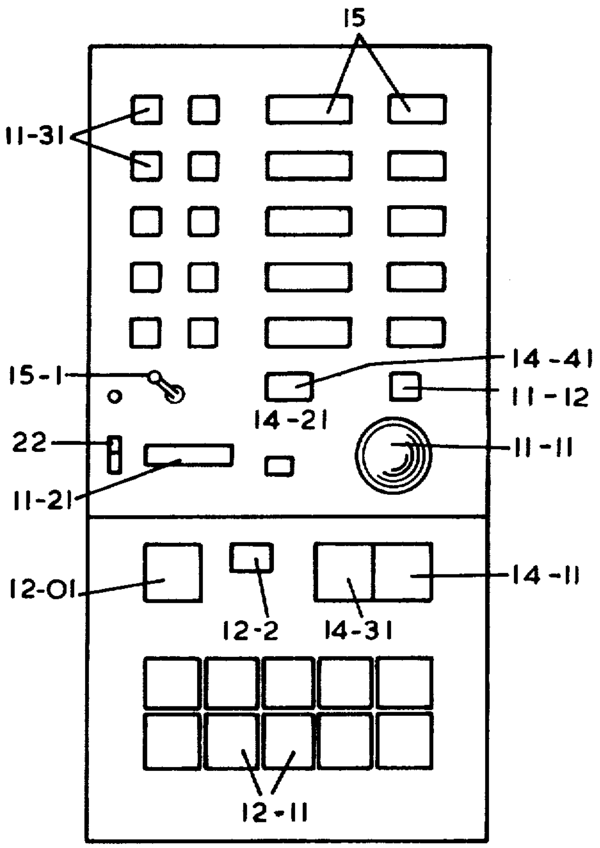
FIGS. 3 and 4 are plan and perspective views of one embodiment of the data acquisition and display device.

The counters 12.0 and 12.1 are conveniently binary digital counters which count one for every electrical pulse received thereby and produce a direct binary equivalent of the number on a plurality of output lines. In each case the counters can be reset to zero by a single pulse applied along a reset line. The counter keys 12.11 of FIGS. 3 and 4 are thus arranged to control switches which when depressed once cause a single count pulse to be applied to one of the counters 12.1. In the embodiment shown in FIGS. 3 and 4 ten such counters 12.1 are required although only two such counters are shown in FIG. 2 and FIGS. 9 and 10.

The counter for accumulating information relating to unwanted points is counter 12.0 and this is stepped by a further switch 12.01 (also shown in FIGS. 3 and 4).

The dimensions of the reference system are calculated by means of the computer module 13.1 and the contents of this module are enclosed by a dotted line in FIG. 9. The difference signal $P_T - P_O$ is obtained by supplying the appropriate value of $P_T$ from 11.1 and the final value of $P_O$ from counter 12.0 to a subtraction device 100. The value of $q^2$ is obtained by multiplying the value of *q* from 11.1 by itself in a multiplying device 102 and the product of these two computed values is obtained by a further multiplying device 104. In this way the value $q^2$ and the value $q^2(P_T - P_O)$ are obtained.

The difference value $P_T - P_O$ is also supplied to a further multiplying device 106 for multiplication with the value of *d* from 11.21. The product is supplied to a further multiplying device 108 for multiplying with the value of K1 from 11.1 and the product forms a further output signal from module 13.1.

A fourth output signal is obtained by multiplying the value *d* from 11.21 in a further multiplying stage 110 by itself to produce $d^2$ which is then multiplied by the value of *d* again in a further multiplying stage 112 to provide the value $d^3$. This is multiplied in a further multiplying stage 114 with the value K3 from 11.1 and the product is multiplied by the value $(P_T - P_O)$ in a further multiplying stage 116. The final product is divided into the value of *q* from 11.1 in a dividing device 118 the quotient answer constituting the fourth output signal from module 13.1.

Using the four output signals obtained by these computations, the count values obtained by depressing the counter keys 12.11 and 12.01 can be converted into parameter values of the field under analysis. This further computation is achieved in module 13.2 the component parts of which are also shown surrounded by a dotted outline in FIG. 9.

Module 13.2 is supplied at input 120 with the digital value of the count value contained in the counter 12.1 which has been used to count the point counts P of the main test points for the specimen. This signal is either applied directly to one input of a divider device 122 with switch 124 in the position shown or after multiplication by the value $q^2$ in a multiplying device 126 when the switch 124 is in the other position to that shown. The value of the quotient produced by the divider stage 122 will correspond to the volume density of the main test points with switch 124 in its second position and the volume density from the point count P' of the fine point lattice with the switch 124 in the position shown. A second switch 128 is provided which is linked with switch 124 so that the appropriate volume density value is supplied either to store 130 or 132. Each store is for example a shift register which is capable of being reset to zero by a reset signal applied along line X.

The surface density which is calculated from the intersection point count (I) of the surface contour with the heavy lines is obtained by dividing the numerical value of I from the appropriate counter 12.1 in a divider device 134 by the product output of multiplier device 108. The quotient output from divider 134 is stored in a register 136 which may also be reset to zero by a signal supplied to point X.

The numerical density of particles per unit volume is obtained from the equation for $N_V$ given earlier. To this end the output of divider device 118 is divided by the square root of the numerical value of the volume density of the point count for the fine point lattice (P') in a divider device 138. The square root of P' is obtained using a square root function device 140. The quotient from divider device 138 is multiplied with the numerical value of the number of profiles in the filed (N) raised to the power 3/2. To this end the value of N from the appropriate counter 12.1 is supplied to a square root function device 142 the output of which is supplied to a multiplier 144 the other input of which is supplied with the original value of N. The product output of the multiplier device 144 is thus equal to $N^{3/2}$ and this is supplied as the second input to a multiplier 146 the first input of which is the quotient output of divider 138. The product output of multiplier 146 is stored in a register 148 which again may be reset to zero by an appropriate signal at point X.

Referring to FIG. 4 each of the counters beneath one of the counter keys 12.11 is associated with a parameter selector dial 11.31. The selector dial 11.31 controls a bank of switches which in turn control the connections between the output of the counter 12.1 below the associated key 12.11 and the inputs to the computing module 13.2 and separately controls the electrical connections between the outputs of the computer module 13.2 and a statistical computation module 13.3 as described above and shown in more detail in FIG. 12. One statistical module is provided for each pair of counters 12.1 (and therefore selector dials 11.31) so that as shown in FIG. 4 there are five double displays 15, one for showing the mean value and the other the standard deviation of results supplied thereto.

The precise method of switching between the outputs of the counters 12.1 and the inputs to the computing module 13.2 and correspondingly between the outputs of the computing module 13.2 and the input to the statistical module 13.3 and the provision of a direct connection between the output of the selected one of the counters 12.1 and the input to the statistical module 13.2 to provide for the display of the mean and standard deviation of the number of direct counts, are not shown for the sake of clarity.

Although not shown in FIGS. 9 and 10 an indicator is provided to indicate the parameter whose value is to be calculated from the numerical data entered into each of the counters 12.1. Conveniently this is combined with a switching device for automatically connecting the output of that counter to the appropriate inputs of the computing unit 13.1 and establishing the appropriate connections between the output of the related statistical module 13.2 and the display device (S) associated with that counter.

Likewise no details are given of the display devices for indicating the numerical values of the mean, the relative standard deviation and the number of consecutive calculations. These display devices may be of any convenient form but are preferably so called digital read out devices in which alpha numeric characters are generated typically using light emitting diodes from binary information supplied thereto.

Referring now to FIG. 10, the statistical module 13.3 has an input junction Y, a binary signal appearing thereat being summed with itself in an adding stage 150 to produce a summation signal which is then divided by the value *n* in a divide stage 152. *n* is obtained from a counter 14.1 which counts 1 for each operation of the switch 14.11. This latter is the control key which triggers the computation sequence after completion of counting on one test field and the number *n* is therefore equal to the number of test fields which have been computed to date. Counter 14.1 can be reset by a signal on a reset input conveniently obtained from a switch 154.

Adding stage 150 obviously requires to have a memory for holding the sum to date and this can be cleared by means of a reset signal which is conveniently obtained from the switch 154.

The standard deviation value is obtained by producing the square of the parameter value supplied to the junction Y in a multiplier stage 156 the output of which comprises one input to an adding stage 158 similar to adding stage 150 in that it has a memory which can be reset conveniently from the operation of switch 154. The value stored in the memory in counter 158 thus constitutes the sum of the squares of the parameter value supplied to the junction Y since the last time the memory of adding stage 158 was reset.

This value is supplied to a divider device 160 which divides it by the value of *n* for the time being from the counter 14.1 and this value is supplied to one input of a subtraction stage 162.

Additionally the summation value from the adding stage 150 is squared by a multiplying device 164 adapted to multiply any numerical value supplied to it by itself, and this value is then divided by the value of $n^2$ obtained by multiplying the value of *n* by itself in a further multiplying stage 166. The quotient obtained from the divider stage 168 is supplied as the second input to the subtraction stage 162, the output of which is supplied to a square root function device 170, the output of which constitutes the value of the standard deviation.

Two output signals from module 13.3 are supplied separately to two registers 172 and 174 the outputs of which are presented in digital form on digital read out devices 15 which are capable of being reset by an appropriate signal being supplied to point K.

At the input to each of the stores in computing module 13.2 and the registers 172 and 174, sensing circuits are provided to indicate via a control circuit 176 when a given set of values have been entered into the stores. This is arranged to provide a control signal to a print-out device and simultaneously to close switches shown at 178 to connect the outputs from the mean and standard deviation registers 172 and 174 to the print-out device 180. An override switch 13.31 is provided for arranging for the print-out device to print out at any selected time.

The value from counter 14.1 is also supplied to a digital read out device 14.41.

It will be seen that the apparatus described allows a point by point analysis of a field to be undertaken and to provide a display in easy to read form of the mean and standard deviation of the parameter values computed from the information obtained from the fields studied to date. In this way it is possible to terminate an analysis of a specimen after just the required number of fields have been analysed to provide a required degree of accuracy in the values computed for the parameters under consideration.

Although not shown an additional counter may be provided operable from the indicator such as 11.31 in FIGS. 3 and 4, to indicate which of a plurality of different test systems should be used for the analysis. As a further refinement the additional indicator may be adapted to select the appropriate test system and automatically locate it in position.

Each of the arithmetical functions of adding, subtracting, multiplying, dividing and forming the square root may be performed by a semi-conductor device type C151/1 plus C151/2 as manufactured by the General Instrument Corporation of the U.S.A. It will be appreciated that the block circuit diagram of FIGS. 9 and 10 has been simplified by the omission of the buffer stores and similar devices which, as is well known in the art, would be required between these devices.

By appropriate programming, either the cumulative standard error or the confidence interval associated with the field measurements can be displayed and made continuously available to the analyst. This is of particular importance because point counts are abstract statistical measurements from which it is difficult to appreciate how good the measurement of the parameter is. The efficiency of a point counting procedure should be greatly improved by this provision of continuous availability of a measure of the achieved precision of reliability of the parameter estimate.

The system described herein also provides facilities for field correction and thus allows the inclusion of sample fields which are not completely coincident with the test system. In previous arrangements involving the linking up of a point counting apparatus with a computer, this point could be considered in programming the computer but would require considerable theoretical knowledge on the part of the programmer.

In general it is envisaged that apparatus incorporating the invention will be used by skilled operators having a good knowledge of point counting analysis techniques. However as a further means of assistance for less skilled operators, a further dial may be provided for indicating the particular mode of point counting to be adopted in order to obtain the required stereological information from the analysis. Thus if the operator were to dial to the effect that he required a measure of the volume density of one particular phase relative to a second phase of a specimen but disregarding a third phase then the indicator associated with the dial would indicate to the operator that he would need to undertake a point count of the points of intersection of the heavy line lattice which coincide with the desired phase and to count using key 12.01 similar points of intersection which coincide with the third unwanted phase. As a further refinement the dial could be associated with switch means which automatically select appropriate ones of the keys 12.11 and appropriate displays 15 via selector dials 11.31 and conveniently illuminate or otherwise indicate the selected keys and displays to further assist the operator in the analysis of the field.

A further refinement which may be added involves the use of a further computing module for computing for a given sequence of fields a given percentage confidence interval and generating a warning signal which may be either audible or visible or both when the results obtained from the sequence of fields achieves the given statistical confidence level.

I claim:

1. A stereological counting and computing device comprising, in combination:- an optical system for forming an image of a specimen;

means for causing a test system to be seen in the plane of the image of the specimen;

at least two manually operable counters for separately recording numerical data obtained from a visual analysis of the image of the specimen using the test system;

a computing unit;

means for determining which one of a plurality of test systems is in use and for supplying to the computing unit data relating to the test system whereby the computing unit is programmed to calculate numerical values of at least two parameters of the specimen from the data recorded in the counters together with the mean and relative standard deviation of the calculated values; and at least one display device for each of the mean and relative standard deviation whereby an estimate of the accuracy of the calculated values can be made after each entry of data from the counters.

2. A device as set forth in claim 1 further comprising means for indicating the parameter whose value is to be calculated by the computing unit from the numerical data entered in a counter.

3. A device as set forth in claim 2 further comprising indicating means responsive to the parameter indicating means to indicate which of a plurality of test systems should be used for the analysis.

4. A device as set forth in claim 3 wherein the indicating means is adapted to select the appropriate test system and automatically locate it in position.

5. A device as set forth in claim 1 further comprising means for indicating the parameter to which a displayed mean value relates.

6. A device as set forth in claim 1 further comprising:

a counter which is indexed by 1 for each parameter value calculation performed by the computing unit;

a display device for displaying the number stored in the counter; and means for resetting the counter and display device to zero at the beginning of a series of tests on a specimen.

7. A device as set forth in claim 1 wherein the display devices for displaying the mean and relative standard deviation and the number of consecutive calculations are digital read out devices.

8. A device as set forth in claim 1 wherein the projection system includes a frosted glass screen onto which the image of the specimen is projected.

9. A device as set forth in claim 1 wherein the means causing the test system to be seen comprises a cathode ray tube, means for supplying operating current and potential thereto and means for generating electrical signals to produce one of a plurality of different patterns in the cathode ray tube display each corresponding to one of the test patterns and optical focussing means for focussing the cathode ray tube display so as to be visible in the plane of the image of the specimen.

10. A device as set forth in claim 1 in which the test system is a film having transparent and non-transparent regions defining a pattern which is situated so that the image of the specimen is viewed therethrough.

* * * * *